V. LEONARD.
Bee Hive.
No. 68,759.
Patented Sept. 10, 1867.
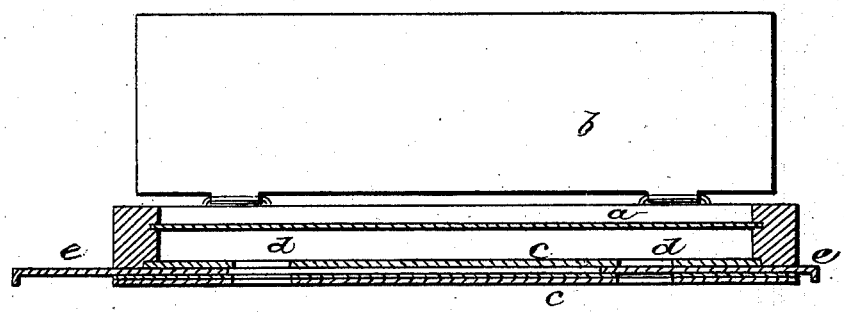
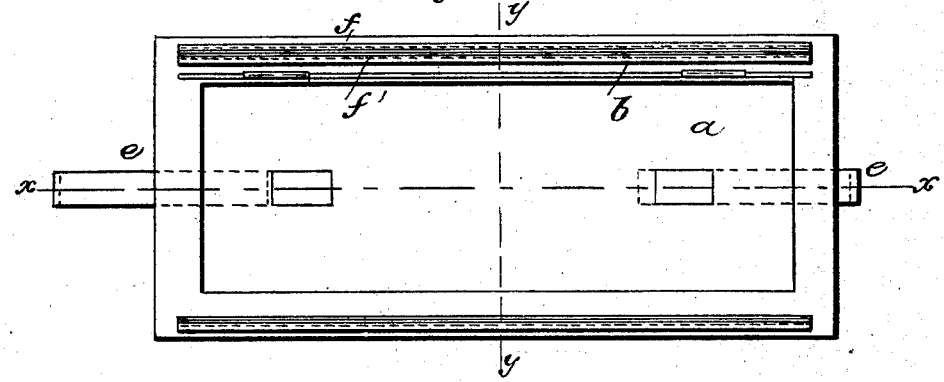
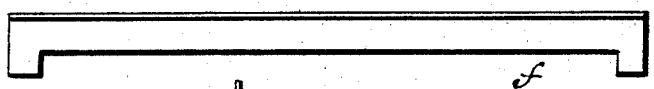
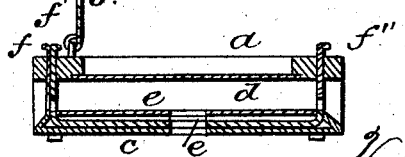
Witnesses
Thos. Tusch.
J. A. Service.
Inventor
Volney Leonard
Per Munn & Co.
Attys.

United States Patent Office.

VOLNEY LEONARD, OF SPRINGFIELD, PENNSYLVANIA.

Letters Patent No. 68,759, dated September 10, 1867.

---

IMPROVEMENT IN BEE-HIVES.

---

The Schedule referred to in these Letters Patent and making part of the same.

---

TO ALL WHOM IT MAY CONCERN:

Be it known that I, VOLNEY LEONARD, of Springfield, in the county of Bradford, and State of Pennsylvania, have invented a new and improved Trap for Catching Queen Bees; and I do hereby declare that the following is a full, clear, and exact description thereof, which will enable others skilled in the art to make and use the same, reference being had to the accompanying drawings, forming part of this specification, in which—

Figure 1 is a longitudinal vertical section of my invention, taken in the line $x\,x$, fig. 2.

Figure 2, a plan or top view of the same.

Figure 3, a detached side view of a slide pertaining to the same.

Figure 4, a transverse vertical section of the same, taken in the line $y\,y$, fig. 2.

Similar letters of reference indicate like parts.

This invention relates to a new and improved trap for catching queen bees during the issuing of a swarm from a hive, and is designed to prevent the swarming of bees, or to place swarming under the complete control of the apiarist.

The trap is a quadrangular box, quite shallow, about one-quarter of an inch deep, three inches wide, and of such a length that it may be fitted in or to the bee entrance of a hive. This box or trap has a glass top, $a$, covered by a metal door, $b$, and the bottom of the box or trap is composed of metal plates $c$, which are perforated to form two openings, $d\,d$, for the queens to pass through, slides $e$ being inserted between the plates $c$ for closing said openings when necessary. At one side of the box or trap there are placed two vertical slides, $f\,f'$, which are notched at their lower ends, as shown in fig. 3, and at the other side there is a similar slide, $f''$.

By means of these notched slides the bees ("workers") may be allowed in swarming to pass through the box, the slide $f''$ at the outer side of the box being down to allow the bees to pass out, the notch in it being sufficiently deep for that purpose, but not deep enough to allow the queens to pass through. The slide $f'$ at the inner side of the box is raised to allow the queens to pass into the box, the other slide $f$ adjoining not being raised, as it has a deeper notch to admit of the queens passing through, but not sufficiently deep to allow the drones to pass into the box. The advent of the queens into the box may be seen by raising the door $b$; and when the queens have entered the box the slide $f'$ is lowered to confine the queens in the box, and the box or trap removed from the bee entrance of the hive, it being understood that the box or trap is placed at the bee entrance. When the queens are entrapped the box or trap may be placed over a cage or box, and the slides $e$ drawn out to admit of the queens passing through the opening $d$ into the cage or box.

The bees, it will be understood, will invariably return to the hive on account of the entrapping of the queen, and hence it will be seen that swarming is placed under the complete control of the apiarist.

I claim as new, and desire to secure by Letters Patent—

A trap for catching queen bees during the time of swarming, composed of a shallow box provided with slides, and a glass in the top, all arranged substantially as herein set forth.

VOLNEY LEONARD.

Witnesses:
W. BROWN,
JERRE ADAMS.